United States Patent Office 3,654,258
Patented Apr. 4, 1972

3,654,258
DISPERSE YELLOW DYE OF 5-(2-NITRO-p-ANISYLAZO) BARBITURIC ACID
Donald Edward McKay, 249–A S. 8th Ave., Highland Park, N.J. 08904
No Drawing. Filed Aug. 27, 1969, Ser. No. 853,539
Int. Cl. C09b 29/36
U.S. Cl. 260—154                                    1 Claim

ABSTRACT OF THE DISCLOSURE

A colorfast strong yellow disperse dye is prepared by coupling 2-nitro-p-anisidine to barbituric acid to form 5-(2-nitro-p-anisylazo) barbituric acid, m. 305–6° C. It dyes polyesters and organic derivatives of cellulose (including acetate and triacetate), and nylons in greenish yellow shades.

---

This invention relates to a new azobarbituric acid disperse yellow dye and to certain polymeric fibers dyed therewith. The invention includes the dye itself, which is a new chemical compound, dyeing compositions containing it, and processes in which they are applied to textile fibers and fabrics, and textiles dyed therewith.

I have found that the compound 5-(2-nitro-anisylazo) barbituric acid, which has the formula

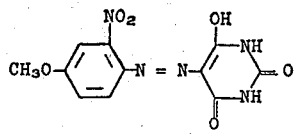

is an excellent disperse yellow dye for dyeing polyesters, nylons, and acetate and triacetate fabrics and fibers. It dyes these fibers greenish-yellow shades of excellent strength and colorfastness when applied by known disperse dyeing procedures. This is a new and surprising discovery, for other dyes of comparable chemical structure have not shown this desirable combination of properties.

The new compound of my invention is prepared by coupling diazotized 2-nitro-p-anisidine to barbituric acid in aqueous medium in the presence of a buffer such as sodium acetate. The insoluble product is separated, washed with water, and preferably kept in the form of a paste, paste blend, or concentrated aqueous dispersion until used in the dyeing procedure. It is usually blended with one or more surfactants, or dispersants, and homogenized with water to which small amounts of additives are added, such as a perspective, germicide, and antifoam.

I have found that the 5-(2-nitro-p-anisylazo) barbituric acid of my invention is an outstanding disperse dye for the so-called Thermosol method, a high temperature dry heat fixation method by which polyester-containing fabrics, especially polyester-cotton fabrics, are dyed. It produces very strong greenish-yellow shades on polyester without dyeing the cotton. The latter is washed or scoured free of any trace of adhering dye.

In permanent press treatment, which is applied to a finished dyed garment of polyester/cellulosics such as polyester/cotton and polyester/rayons, the dye of my present invention shows no shade change. Stability of shade in permanent press operation is an important property and an advantage. Also, during the high temperature curing step in which there is a prolonged heating period, many disperse dyes sublime, resulting in weakening of color and staining of combined fibers or fabrics. The dye of this invention shows little or no sublimation under permanent press conditions. It is also stable in the presence of zinc nitrate, a preferred catalyst for curing, so there is no need to switch to a less favorable catalyst.

Sublimation fastness of the compound of this invention can be demonstrated by sandwiching dyed polyester fabric between undyed polyester fabric and cotton, and subjecting it to temperatures of about 422 to 437° F. Many of the known azo yellow disperse dyes tend to sublime badly at these temperatures whereas the dye of this invention shows little or no sublimation.

Another exceptional property of the dye or compound of my present invention is its fastness to light. A comparison of its lightfastness with those of similar azo dyes is given in Example 4. These comparisons are for a medium 0.5% shade. Well known AATCC tests and ratings are used. The rating of 6 on polyester and acetate is very good. The rating on triacetate is also 6. The 2% shade has a rating of 6–7 by carbon-arc lamp, which is very-good-to-excellent, and a rating of 7 using a Xenon light source, which is excellent. This is surprising in view of the much lower lightfastness of other yellow azo dyes of the barbituric acid series.

The dye of this invention also has a high rating for colorfastness to washing, acid and alkaline perspiration, and to crocking, rating 5 for all. It also has very high tinctorial value which is both an important property and an economic advantage.

Known yellow disperse dyes tend to be deficient in one or more of the above properties. It is surprising that this particular chemical compound has such outstanding fastness properties. It also has good general dyeing properties such as good dispersion, leveling, and migration properties.

The dye of this invention finds greatest use on polyester, polyester blends, and organic derivatives of cellulose such as acetate and triacetate. It also has affinity for nylons and relatively good lightfastness compared to known dyes on these polyamide fibers. It does not dye polypropylene fibers as currently modified.

The invention will be further described and illustrated by the following specific examples to which, however, it is not limited.

EXAMPLE 1

Preparation of 5-(2-nitro-p-anisylazo)-barbituric acid

A suspension of 3.4 parts by weight of 2-nitro-p-anisidine in 30 parts of 10% of hydrochloric acid is prepared and cooled to 0° C. in an ice bath with internal addition of ice. A solution of 1.4 parts of sodium nitrate in 5 parts of water is added slowly and the resulting mixture is stirred with cooling for one-half hour.

A mixture of 2.6 parts by weight of barbituric acid and 15 parts of sodium acetate in 50 parts of water is prepared and cooled to 0°–5° C. The above-described diazonium solution is then added and the mixture is stirred for four hours, after which the resulting 5-(2-nitro-p-anisylazo)-barbituric acid is separated by filtration, washed with water, and dried in a vacuum at 70° C. Recrystallization from ethanol results in a product melting at 305–306° C.

Calculated for $C_{11}H_9N_5O_6$ (percent): C, 43.00; H, 2.95; N, 22.80. Found (percent): C, 42.77; H, 2.93; N, 22.91.

EXAMPLE 2

(A) Diazotization 2-nitro-p-anisidine

To a mixture of 600 g. ice and 200.2 ml. 20° Bé. hydrochloric acid is added 104.4 g. real 2-nitro-p-anisidine. To this chilled solution is added over 15–30 min. 177.6 ml. 25% sodium nitrate solution to a positive test on starch iodide indicator paper. The solution is stirred at 0° C. for one hour. When diazotization is complete, sulfamic acid is added to a negative test on starch iodide paper. This solution is added to B.

(B) Coupling

The diazo solution is added gradually at 0 to 5° C. over two hours to a slurry produced by mixing 76.8 g. real barbituric acid and 208.8 g. sodium acetate buffer with 800 g. ice. The coupling is stirred two hours at 0° C. and then without temperature control until complete.

The product is isolated by filtration and washed with hot water to give 457 g. wet cake, a 20.4 g. test portion of which dries to 9.0 g. when dried at 70° C.

EXAMPLE 3

Dye tests by Thermosol method

This example shows the application of the new dye to a polyester fabric by a dry heat fixation method. Test results of other similar barbituric acid azo dyes are given for purposes of comparison.

A 450 mg. sample of the product of Example 1 is dissolved with warming in 20 ml. N-methyl-2-pyrrolidone as solvent. The solution is added to a mixture of 40 ml. 10% water-soluble dextrin and 40 ml. 10% sodium lignin sulfonate. The mixture is homogenized in a Waring Blendor to produce a dispersion. The dispersion is padded on polyester fabric derived from ethyleneglycol and terephthalic acid using a Butterworth three roll padder to give a pick-up of 60% and dried in hot air at 160° F. for a half hour. Heat of 410° F. is applied for 1.5 minutes. The fabric is rinsed with water, soaped ten minutes at the boil in 0.1% neutral soap solution, rinsed with water and dried. A strong uniform yellow shade of good sublimation fastness, rating 4–5 at 410° F. for 30 seconds, is obtained. A comparison of its shade and strength with other barbituric acid dyes, similarly dyed, is given in Table I below.

TABLE I

| Dye | Azo combination |
|---|---|
| a | 2-nitro-p-anisidine ... Barbituric acid. |
| b | do ... Thiobarbituric acid. |
| c | do ... 2-methylbarbituric acid. |
| d | 2-methoxy-p-nitraniline ... Barbituric acid. |

| | Dyeings | |
|---|---|---|
| | Shade | Strength |
| a | Bright green-yellow | 100% (standard of comparison). |
| b | Very much redder; sl. duller | 90%. |
| c | Redder and duller | 50%. |
| d | Greener | 50%. |

These results show that the dye of this invention (Dye *a*) is superior in strength to other dyes of the same class.

When the above procedure is repeated with woven polyester and cotton checked fabric, Dye *a* leaves the cotton white while Dyes *b*, *c* and *d* stain the cotton.

EXAMPLE 4

Disperse dyeing procedure

The four dyes described in Example 3 as Dyes *a*, *b*, *c* and *d* are also applied by the following disperse dyeing procedure.

A stock dye solution is prepared by dissolving 175 mg. dye in 20 to 30 ml. acetone. This is added to a solution prepared by mixing 7 ml. 5% sodium lauryl sulfate solution in 100 ml. water at 120° F. The volume is brought to 350 ml. volume with water 100 to 120° F.

A 50 ml. portion of the above dye stock solution is added to 1500 ml. water. In the case of dyeing polyesters, a carrier is used in the dyebath. The amount of carrier used is 3 ml. of a 50% methyl salicylate aqueous emulsion.

A 5-gram skein of fibers of the type mentioned below is introduced. The dyebath is heated to the temperature indicated and dyed for one hour at that temperature. It is removed and rinsed. Two of the types are scoured, after dyeing; polyester and modified polypropylene. Scouring is done for 10 minutes at the boil in 0.1% neutral soap solution followed by rinsing. Then the skeins are dried.

The same procedure may be followed with 5-gram pieces of fabric instead of yarn or skeins.

| Fibers dyed: | Temperature, °F. |
|---|---|
| Polyester (polyethylene terephthalate) | 212 |
| Nylon 66 carpet yarn | 208 |
| Acetate (cellulose acetate) | 180 |
| Triacetate (cellulose triacetate) | 208 |

A 0.5% shade of dye on the weight of the yarn or fabric is obtained by this procedure.

A comparison of the results on skeins, using this procedure, is given in Table II.

TABLE II

| | 0.5% shade and strength (est.) | | | Lightfastness rating | | | Sublimation rating (contact) |
|---|---|---|---|---|---|---|---|
| Dye | Polyester (Dacron 54) | Nylon 66 (Nylon 501) | Acetate | Polyester | Nylon 66 | Acetate | |
| a | Bri. Green-Y, 100% | Y, 100% | Bri. Green-Y, 100% | 6 | 4 | 6 | 4–5 |
| b | V.M. redder, sl. duller | 100% | 100% | 3–4 | 2 | 3 | 4–5 |
| c | Redder and duller | 100% | 100% | 4 | 3 | 5 | 3 |
| d | Greener | 50% | 50% | 4 | 2 | 4–5 | 5 |

NOTE.—Lightfastness is determined by AATCC Test Method 16A 1964 which employs a carbon-arc lamp. Rating is correlated with hours of exposure needed to produce a slight change in shade:
Rating:  2   3   4   5   6
Hours:   5  10  20  40  80
In this type of progression, lightfastness is doubled with each increase in unit.
Sublimation is determined by sandwiching the dyed polyester skein between cotton and undyed polyester fabric and subjecting the sewn-sandwich to heat of 410° F. for 30 seconds. Any dye subliming will contact the undyed polyester.

EXAMPLE 5

Blended dye composition

A blend is prepared by mixing in a ball mill and screening:

| | Parts |
|---|---|
| Dye of Example 1 | 21.00 |
| Sodium lignosulfonate, dispersant | 7.80 |
| Dextrin | 7.80 |
| Sod. 2,4,5-trichlorophenate sesqui-hydrate | 0.20 |
| Antifoam | 0.05 |
| Phenyl mercuric acetate | 0.03 |
| Water | 63.12 |
| Dye dispersion | 100.00 |

This blend is suitable for application to fibers by the procedures of Examples 3 and 4.

What I claim is:
1. 5-(2-nitro-p-anisylazo) barbituric acid.

References Cited

UNITED STATES PATENTS 2,140,538   12/1938   McNally et al. _____ 260—154

JOSEPH REBOLD, Primary Examiner

D. M. PAPUGA, Assistant Examiner

U.S. Cl. X.R.

8—41 B, 41 C, 50, 79, 173

UNITED STATES PATENT OFFICE
CERTIFICATE OF CORRECTION

Patent No. 3,654,258                    Dated April 4, 1972

Inventor(s) Donald Edward McKay

It is certified that error appears in the above-identified patent and that said Letters Patent are hereby corrected as shown below:

Column 1, line 5, after the inventor's address, insert -- assignor to American Cyanamid Company, Stamford, Conn. --.
Column 1, line 26, "5-(2-nitro-anisylazo)" should read -- 5-(2-nitro-p-anisylazo) --.
Column 1, line 51, "perspective" should read -- preservative --.
Column 2, line 65, "200.2" should read -- 220.2 --.
Column 2, line 68, "nitrate" should read -- nitrite --.
Column 4, line 6, "1500" should read -- 150 --.

Signed and sealed this 6th day of March 1973.

(SEAL)
Attest:

EDWARD M. FLETCHER, JR.            ROBERT GOTTSCHALK
Attesting Officer                  Commissioner of Patents